United States Patent Office 3,170,943
Patented Feb. 23, 1965

3,170,943
PROCESS FOR MAKING PHOSPHORIC ACID ESTER ANHYDRIDES
Friedrich D. Cramer, Darmstadt-Eberstadt, and Manfred G. Winter, Griesheim, near Darmstadt, Germany, assignors to Shell Oil Company, New York, N.Y., a corporation of Delaware
No Drawing. Filed Sept. 12, 1961, Ser. No. 137,493
Claims priority, application Germany, Sept. 17, 1960, S 70,406
8 Claims. (Cl. 260—461)

This invention relates to a process for the production of phosphoric acid derivatives. More particularly, this invention relates to a process for the production of phosphoric acid derivatives wherein halophosphoric acid esters of the general formula

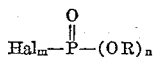

wherein Hal=halogen and R represents an alkyl, cycloalkyl, aryl or alkaryl group, $m$ and $n=1$ or 2, with the proviso that $m+n=3$, are reacted with other compounds, e.g., organo phosphoric acids and carboxylic acids, in the presence of formamides, and if necessary, in the presence of solvents, hydrogen halide being split off.

Preferred halophosphoric acid esters are the monochlorophosphoric acid diesters and the dichlorophosphoric acid monoesters. Preferred halogens are the middle halogens, i.e., chlorine and bromine, with chlorine most preferred. R is preferably alkyl of one to ten carbon atoms, cycloalkyl of three to eight carbon atoms, aryl of six to fourteen carbon atoms or alkaryl wherein aryl is aryl of six to fourteen carbon atoms and alkyl is alkyl of one to ten carbon atoms. R may be substituted or unsubstituted with common substituents such as, for example, the halogens, particularly chlorine.

Suitable solvents are those wherein the components readily dissolve and which are inert under the reaction conditions used, for instance acetonitrile and carbon tetrachloride. Basic solvents, such as tertiary amines, for instance triethylamine, may be used. Pyridine in particular has a yield-increasing effect. Excess formamide, for instance dimethylformamide, may be used as a solvent.

The following formamides according to the invention are particularly suitable for use in the process for the production of phosphoric acid derivatives:

(1) Formamide;
(2) Nitrogen-substituted formamides:
    (a) The mono-substituted formamides, such as monomethyl formamide, N-butyl formamide and N-benzyl formamide;
    (b) The di-substituted formamides, such as dimethyl formamide.

The reactions are exothermic and are usually completed after some hours. Although room temperature is normally used, cooling is required when sensitive materials are used, in which case the reaction lasts somewhat longer.

The process according to the invention is chiefly suitable for the preparation of symmetric and non-symmetric pyrophosphoric acid which latter group of compounds is a widespread, highly important group of natural substances and coenzymes; since the reaction proceeds well at room temperatures and in some cases also at lower temperatures, it is particularly suitable for the preparation of temperature-sensitive compounds. Another advantage of the process according to the invention is that pyrophosphoric acid esters which are particularly sensitive to hydrolysis can be easily produced. When, for instance, dimethyl formamide is used in the preparation of the pyrophosphate, the reaction proceeds as follows:

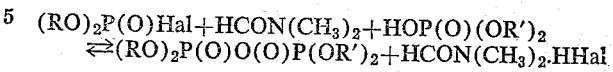

wherein R' has the same significance as R defined herein.

This equilibrium may be completely shifted in the direction of the pyrophosphate under the influence of basic solvents such as triethylamine and pyridine.

In order to establish the influence of the formamide, and in particular of the dimethyl formamide, in parallel experiments dichlorophosphoric acid phenyl esters were reacted with the monotriethyl ammonium salt of chlorophenyl phosphoric acid without dimethyl formamide and in another with dimethyl formamide. In the experiment without dimethyl formamide only a slight formation of pyrophosphate could be observed even after a reaction time of six hours at room temperature. On the other hand, the experiment with dimethyl formamide proceeded exothermally, as was expected, and was completed after twenty minutes. In the first experiment the reaction solution (acetonitrile) remained perfectly clear, whereas in the second the basic hydrochloride precipitated immediately upon adding the dimenhyl formamide.

When R=R' a symmetrical pyrophosphate is formed, and when R≠R' the three possible pyrophosphates may be formed together, being statistically distributed in the ratio of 1:2:1; so even at 100% conversion not more than 50% of the non-symmetric pyrophosphates can be formed. Since the working up of such reaction mixtures is cumbersome, wasteful and difficult and the starting materials may be expensive, the synthesis should, as far as possible, be oriented in one direction. According to the experimental conditions used, varying results may be obtained with the process of the invention.

If according to the equation $$(R \neq R'): (RO)_2P(O)Hal + HCON(CH_3)_2 + (HO)_2P(O)OR' \rightarrow \text{pyrophosphate}$$

the compound $(HO)_2P(O)OR'$ is added dropwise to the mixture of the other two compounds, or when the phosphoric acid monoesters are added simultaneously, three reaction products can be identified, viz. both the anticipated asymmetric product and the two possible symmetric pyrophosphates have been formed. When, however, substituted formamide and the phosphoric acid monoesters are used and the monohalo phosphoric acid diesters are added dropwise to this mixture, so that there is always an excess of phosphoric acid monoesters, only the asymmetric pyrophosphoric acid esters are isolated.

When dichlorophosphoric acid esters are used as starting material, a pyrophosphate having two additional acid functions is similarly formed:

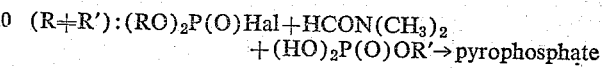

wherein the chlorine present is the pyrophosphate compound formed is readily converted with water into a hydroxyl group.

This hydrolysis is greatly accelerated by the presence of the said formamides in particular. In general, the hydrolysis of phosphoric acid chlorides is also greatly accelerated by formamides without the presence of bases.

The simplest reaction is that resulting in the asymmetric pyrophosphoric acid diesters. Examples are:

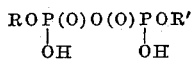

wherein (1)   R=—C₆H₅ and R'=—pClC₆H₄
(2)   R=—pClC₆H₄ and R'=—C₁₀H₇
(3)   R=—CH₂CH₃ and R'=—pClC₆H₄
(4)   R=—CH₂CH₃ and R'=—C₆H₄CH₃ which substances were isolated in the form of bicyclohexyl ammonium salts.

A pyrophosphoric acid monoester may also be formed in this manner, for instance

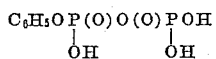

when, for instance, R=—C₆H₅ and R'=H.

Triesters having for instance the general formula

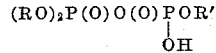

when, for instance, R=R'=—C₆H₅ and tetraesters, for instance tetra-p-chlorophenyl pyrophosphate or tetraethyl pyrophosphate, may also be formed.

The pyrophosphates obtained can be best isolated by precipitation in the form of their salts, viz. either their lithium salts or their cyclohexyl ammonium salts; in this form they are stable compounds.

Another example in which use may be made of the process according to the invention is the synthesis of phosphoric acid carboxylic acid anhydrides.

Phosphoric acid carboxylic acid anhydrides products are synthesized according to the following formula:

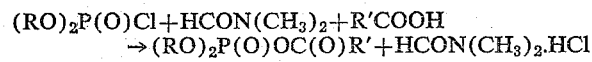

wherein R and R' have the above significance. These compounds are difficult to characterize and can be best described as anilides of the carboxylic-acid half after reaction with aniline.

The compounds prepared according to the invention may, for instance, be used per se or as active components in biocidal compositions. The compounds may also be used as intermediate products for organic syntheses.

PREPARATION OF SYMMETRIC DI-4-CHLOROPHENYL PYROPHOSPHATES

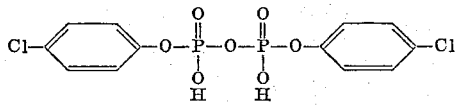

*Example I*

3.65 g. (0.05 mol) of dimethylformamide and 12.27 g. (0.05 mol) of dichlorophosphoric acid-4-chlorophenyl ester were mixed in a dry flask. On heating the contents of the flask immediately set into a lemon-colored mass, which was cooled to room temperature. The solution of 10.43 g. of 4-chlorophenyl phosphoric acid and 5.05 g. of triethylamine in 30 cc. of acetonitrile (abs.) was then added, the temperature rising to approximately 60° C. The reaction mixture was left to stand for two hours.

2 ml. of H₂O were then added, followed by 10.0 g. of cyclohexylamine, a thick colorless precipitate being formed as soon as the amine was added. After some time the mixture was filtered and the residue successively washed with H₂O and acetone. The residue was added until the pyridine had dissolved and the mixture washed with acetone so as to free it from pyridine.

Flash point: 271° C.
Yield: 18.5 g. (62.0% of theory).

PREPARATION OF THE ASYMMETRIC PYROPHOSPHORIC ACID ESTERS

THE DIESTERS

General directions for preparation. Working up varies from case to case.

*Example II.—P¹-phenyl-P²-4-chlorophenyl pyrophosphate—dicyclohexyl ammonium salt*

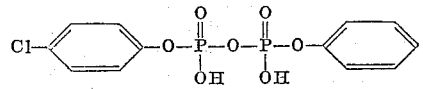

0.025 mol of 4-chlorophenyl phosphoric acid (5.21 g.) and 0.05 mol (0.05 g.) of triethylamine were dissolved in 25 ml. of acetonitrile (abs.) and mixed with 1.82 g. of dimethyl formamide and the mixture then cooled to approximately 0° C. 5.27 g. (0.025 mol) of dichlorophosphoric acid phenylester, diluted with 10 ml. of acetonitrile (abs.), were slowly added dropwise to the cooled mixture with the exclusion of moisture and with vigorous stirring. After the dropwise addition, which lasted approximately 60–70 minutes, 1 ml. of H₂O was added, followed by 5 g. of cyclohexylamine. After some time, during which the mixture was occasionally stirred, it was filtered off. The residue was recrystallized from pyridine/H₂O. After recrystallization, the residue was thoroughly washed with acetone so as to free it from pyridine.

Flash point: 265° C.
Yield: 9.2 g. (65.4% of theory).

*Analysis.* — 562.50 C₂₄H₃₇O₇N₂ClP₂ — Calculated: P=11.00%; N=4.98%. Found: 5.030 mg., 37.490 mg. molybdate F=0.014525=10.83% P; 7.038 mg., 0.299 cu. cm. N, 25.5° C. mm. Hg=4.88% N.

*Example III.—P¹-phenyl-P²-naphthyl pyrophosphate —dicyclohexyl ammonium salt*

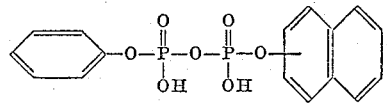

The components reacted as described in Example II in the same molar ratio. 1.2 cc. of H₂O had to be added merely to dissolve the salt. The mixture was filtered off 30 minutes after addition of the cyclohexylamine. The residue was recrystallized from H₂O/ethanol+10% pyridine without washing. The desired product precipitated in the cold.

Flash point: 253° C.
Yield: 18.8 g. (47.8% of theory).

*Analysis.* — C₂₈H₄₀N₂O₇P₂ (578.0) — Calculated: P=10.72%; N=4.84%; C=58.10%; H=6.92%. Found: P=10.72%; N=5.23%; C=57.25%; H=6.83%.

*Example IV.—P¹-ethyl-P²-4-chlorophenyl pyrophosphate —dicyclohexyl ammonium salt*

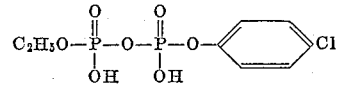

Similar to the products described above. After the addition of the cyclohexylamine the mixture was left to stand overnight in the cold. It was then filtered off and the residue extracted three times with 50 ml. of H₂O. The extract was evaporated to dryness in vacuo at a bath temperature of 30–35°.

The residue was taken up in 50 ml. of H₂O and the undissolved material filtered off: RI.

RI was washed several times with acetone. The acetone together with the filtrate was again evaporated to dryness in vacuo and taken up in 30 ml. of H₂O and the undissolved material again filtered off: RII. This was repeated twice and on the fourth occasion the original filtrate was also evaporated to dryness. The residue was once again taken up in 50 ml. of H₂O and filtered off.

RI—RIV contained chromatographically pure product.

Flash point: 239° C.
Yield: 10.0 g. (39.5%).
Starting materials: 0.05 mol.

Analysis.—514.5 ($C_{20}H_{37}N_2O_4ClP_2$) — Calculated: P=12.06%; N=5.48%; Cl=6.90%. Found: P=11.68%; N=5.43%; Cl=7.01%.

TRIESTER

*Example V.—P¹-diphenyl-P²-phenyl pyrophosphate*

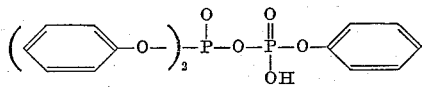

13.42 g. (0.05 mol) of chlorophosphoric acid diphenyl-ester and 3.65 g. of dimethyl formamide were mixed together. After 30 minutes the monotriethyl ammonium salt of monophenyl phosphoric acid dissolved in 30 ml. of acetonitrile was added. (8.70 g. of monophenyl phosphoric acid+5.05 g. of triethylamine). After a short while another 5.05 g. of triethylamine were added and after 10 minutes the mixture was separated by adding 16 g. of cyclohexylamine. When the amine was added, there was substantial rise in temperature, so that the mixture was stirred for 20 minutes with water cooling. On the following morning the mixture was filtered off and the residue extracted three times with 50 cc. of CHCl₃. The extracts collected were mixed with cyclohexane until turbid. After the mixture had stood for some time the precipitate, which consisted of fine, colorless needles, was filtered off. After dissolving and reprecipitation, the material had a flash point of 193° C. and was also identical with N-cyclohexyl aminophosphoric acid phenylester monocyclohexyl ammonium salt according to the analysis.

Analysis. — $C_{18}H_{31}O_3N_2P$ (354.5) — Calculated: C=61.00; P=8.76. Found: 3.873 mg., 22.810 mg. molybdate, F=0.014525=8.55% P; 4.230 mg., 9.502 mg. $CO_2$ =61.30% C.

TETRA ESTER

*Example VI.—Pyrophosphoric acid-tetra-4-chlorophenyl ester*

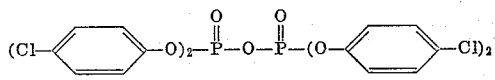

0.45 cc. (0.025 mol) of $H_2O$ and 16.90 g. of chlorophosphoric acid-d-4-chlorophenyl ester were dissolved in 25 cc. of acetonitrile (abs.), with the exclusion of moisture. 10.0 cc. of dimethyl formamide were added to this mixture with generation of heat. After 12 hours, this reaction mixture was mixed with a solution of 5.05 g. (0.05 mol) of triethylamine in 100 cc. of abs. ether while stirring. After the repeated application of light heating the basic hydrochloride immediately precipitated quantitatively. The precipitate was filtered off after cooling to room temperature.

In order to identify the pyrophosphate formed, the ethereal solution was mixed with 9.9 g. (0.1 mol) of cyclohexylamine immediately after filtration. A colorless precipitate was instantaneously formed which was again filtered off after some time and the filtrate successively agitated with 2 n HCl and 2 n NaHCO₃ and then dried with Na₂SO₄. After drying the ether was removed in vacuo and petroleum ether (50–70°), poured over the residue which was then filtered.

Flash point: 119° C.
Yield: 8.0 g. (80% of theory).

Analysis.—$C_{18}H_{20}O_3NCl_2P$ (400.00) — Calculated: P=7.75; N=3.50. Found: P=7.85; N=3.44.

*Example VII.—Pyrophosphoric acid-tetraethyl ester*

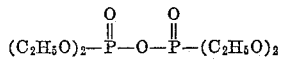

At first exactly as in the above description of the experiment. After filtration of the hydrochloride separated the ethereal solution was rapidly shaken with 2 n NaHCO₃ solution and immediately dried with Na₂SO₄. The material volatile up to a bath temperature of 100° C. was then drawn off at 12 mm. Hg. When no further material passed over at this temperature, high vacuum distillation was applied. Most of the material having a boiling point of 117°–119° C. passed over at a bath temperature of approximately 150° C. at 0.1 mm. Hg. Yield: 9.8 g. (67.5% of theory).

Analysis.—$C_8H_{20}O_7P_2$ (290.0)—

Calculated: P=21.35%; C=33.95%; H=6.90%.
Found: P=20.83%; C=33.29%; H=7.05%.

MIXED ANHYDRIDES BETWEEN DIESTER PHOSPHORIC ACIDS AND CARBOXYLIC ACIDS

*Example VIII.—D-4-chlorophenyl phosphobenzoate*

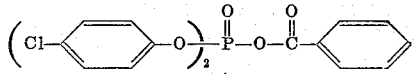

As in the similar, preceding experiments, 6.10 g. (0.05 mol) of benzoic acid, 5.05 g. (0.05 mol) of triethylamine and 3.65 g. of dimethyl formamide were dissolved in 25 cc. of acetonitrile (abs.) with the exclusion of moisture. After approximately 60 minutes 16.90 g. of monochlorophosphoric acid-di-4-chlorophenyl ester were slowly added dropwise to the cooled reaction mixture while cooling with ice water. After completion of the reaction and heating to room temperature 100 cc. of abs. benzene were added and the mixture was rapidly filtered. 9.3 g. of aniline were then mixed with the benzenes solution and the whole was left to stand overnight. On the next morning it was again filtered and the filtrate successively shaken with 2 n HCl, 2 n NaHCO₃ and 2 n Na₂CO₃ solution. After drying the benzene with Na₂SO₄ it was drawn off in vacuo and the residue then recrystallized from alcohol water.

Flash Point: 161° C.
Yield: 8.5 g. (86.3% of theory).
Melting point and mixed melting point were identical with that of benzanilide.

MIXED ANHYDRIDES BETWEEN MONOESTER PHOSPHORIC ACID AND CARBOXYLIC ACIDS

*Example IX.—Mono-4-methylphenyl phosphobenzoate*

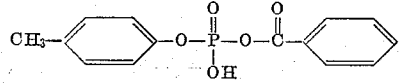

The acylic phosphate was prepared in the conventional manner from 3.05 g. of benzoic acid (0.025 mol), 2.5 g. (0.025 mol) of triethylamine, 1.82 g. (0.025 mol) of dimethyl formamide and 5.55 g. of dichlorophosphoric acid-4-methylphenyl ester in 25 cc. of acetonitrile. The precipitated hydrochloride was first filtered off and the filtrate slowly added dropwise, with the exclusion of moisture, to a solution of 4.2 g. (0.05 mol) of NaHCO₃ in 30 cu. cm. of $H_2O$. In the presence of 4.65 g. of aniline a colorless precipitate was formed after some time which, after drying and recrystalliaztion, was found to have a melting point of 159° C. (benzanilide). Yield: 2.85 g. (58.5% of theory).

We claim as our invention:

1. The process for the preparation of organo phosphoric acid esters selected from the group consisting of

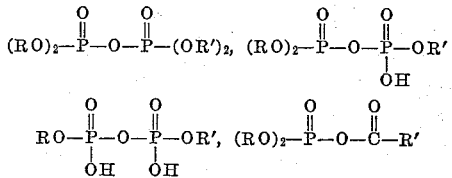

and

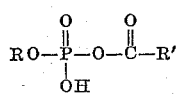

wherein R and R' are as defined hereinafter, which comprises reacting, in the presence of dimethyl formamide, organo chlorophosphoric acid ester of the formula

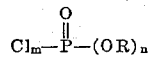

with an acid selected from the group consisting of R'COOH,

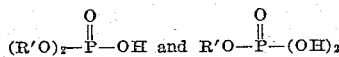

wherein R and R' are individually selected from the group consisting of alkyl of 1 to 10 carbon atoms, cycloalkyl of 3 to 8 carbon atoms, aryl of 6 to 14 carbon atoms in the aromatic nucleus thereof and of 1 to 10 carbon atoms in any alkyl substituents thereof, and the corresponding chloro-substituted radicals, and $m$ and $n$ are integers from 1 to 2 with the proviso that their sum be 3.

2. The process according to claim 1 wherein

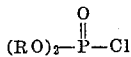

is reacted with

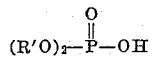

to form

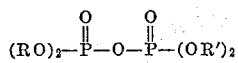

3. The process according to claim 1 wherein

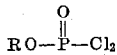

is reacted with

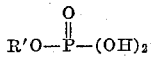

to form

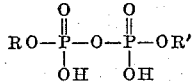

4. The process according to claim 1 wherein

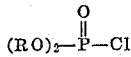

is reacted with R'COOH to form

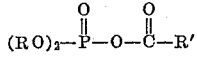

5. The process according to claim 1 wherein

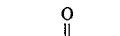

is reacted with R'COOH to form

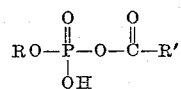

6. The process according to claim 1 wherein the reaction is carried out in the presence of a hydrogen chloride binding agent selected from the group consisting of pyridine and triethylamine.

7. The process according to claim 4 wherein

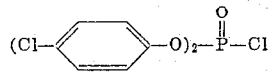

is reacted with

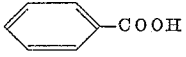

to form

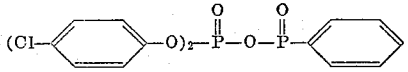

8. The process according to claim 5 wherein

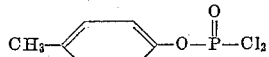

is reacted with

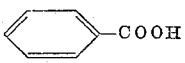

to form

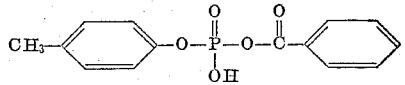

References Cited by the Examiner

UNITED STATES PATENTS

| | | | |
|---|---|---|---|
| 2,552,326 | 5/51 | Kosolapoff | 260—461.302 |
| 2,606,203 | 8/52 | Smith et al. | 260—461.313 |
| 2,881,147 | 4/59 | Graham | 260—461.305 |
| 3,005,007 | 10/61 | Fierce et al. | 260—461.305 |
| 3,031,488 | 4/62 | Pohlemann et al. | 260—461.1 |

FOREIGN PATENTS

| | | |
|---|---|---|
| 690,385 | 4/53 | Great Britain. |

OTHER REFERENCES

Cramer et al.: Chem. Berichte, April 1961, vol 94, No. 4, pages 989–996.

Zemlyanskii et al.: Chem. Abst., vol. 51, col. 3331 (1957).

Petrov et al.: Chem. Abst., vol. 54, col. 8600 (May 10, 1960).

CHARLES B. PARKER, *Primary Examiner.*

MORRIS LIEBMAN, IRVING MARCUS, *Examiners.*